Sept. 6, 1932.  E. H. REMDE  1,875,762
INDUSTRIAL TRUCK
Filed Aug. 6, 1929   3 Sheets-Sheet 1
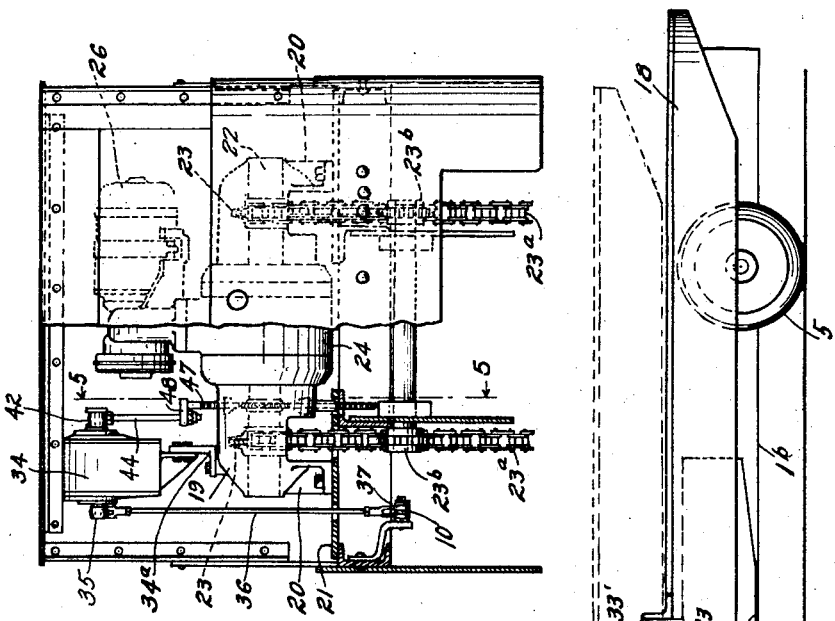
INVENTOR
Edward H. Remde
By Geo. A. Pitts
ATTORNEY Sept. 6, 1932.  E. H. REMDE  1,875,762
INDUSTRIAL TRUCK
Filed Aug. 6, 1929   3 Sheets-Sheet 2
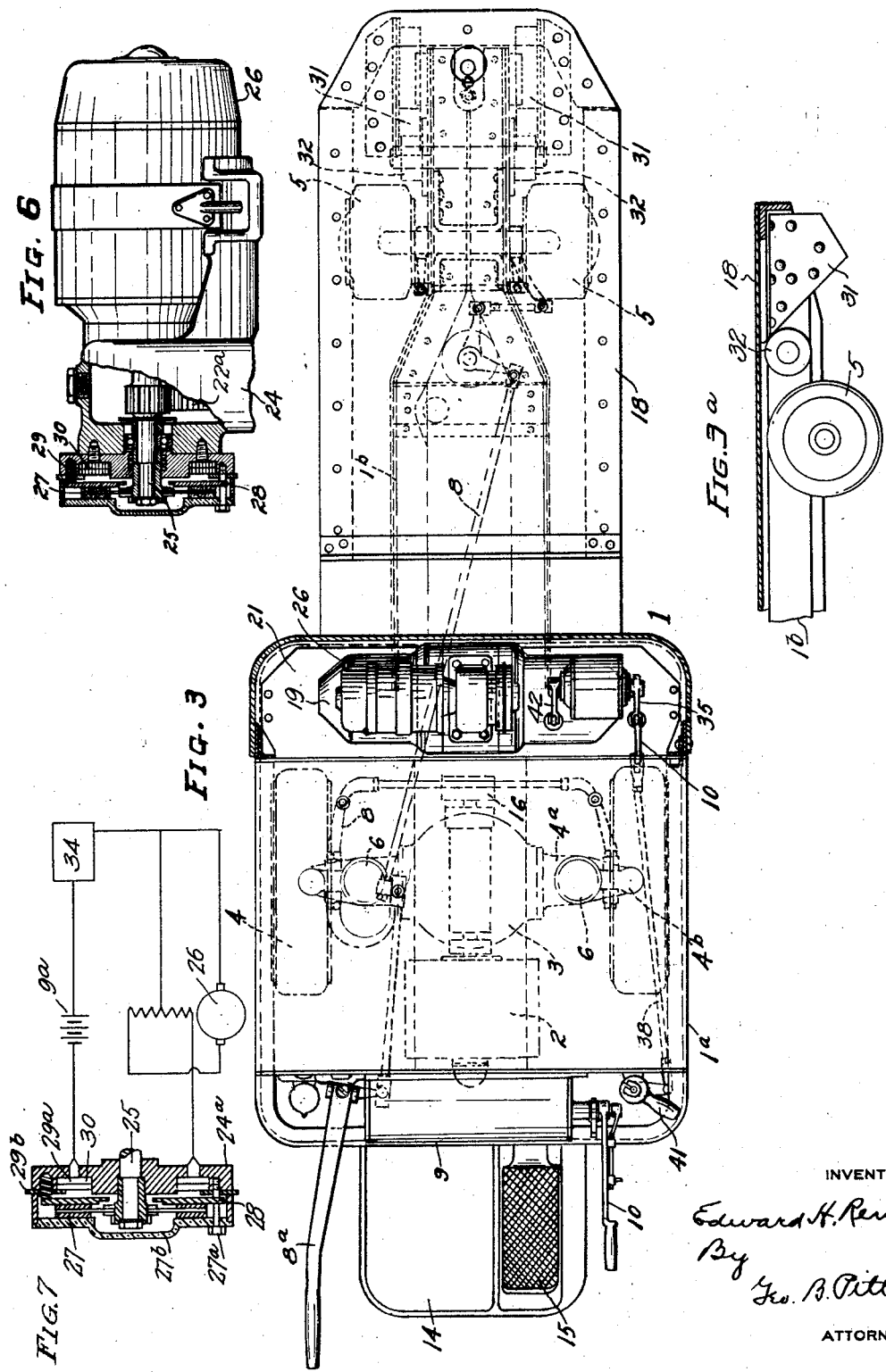
INVENTOR
Edward H. Remde
By
Geo. B. Pitts
ATTORNEY Sept. 6, 1932.  E. H. REMDE  1,875,762
INDUSTRIAL TRUCK
Filed Aug. 6, 1929  3 Sheets-Sheet 3
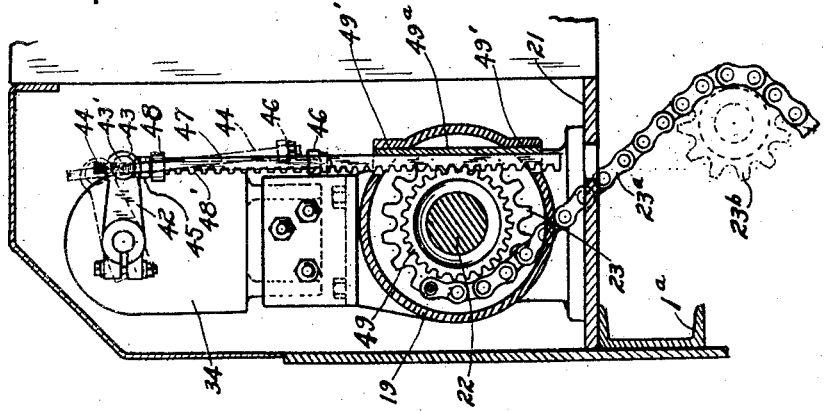
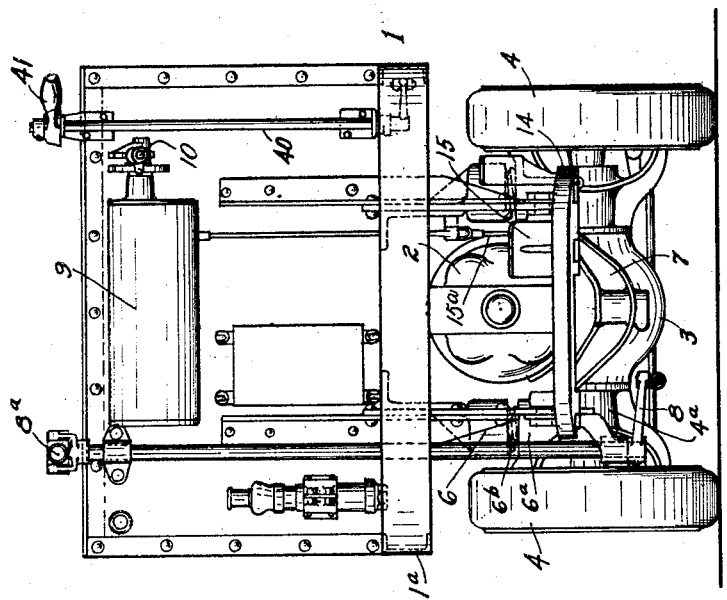
INVENTOR
Edward H. Remde
By Geo. B. Pitts
ATTORNEY Patented Sept. 6, 1932

1,875,762

UNITED STATES PATENT OFFICE

EDWARD H. REMDE, OF CLEVELAND, OHIO, ASSIGNOR TO THE BAKER-RAULANG COMPANY, OF CLEVELAND, OHIO, A CORPORATION OF OHIO

INDUSTRIAL TRUCK

Application filed August 6, 1929. Serial No. 383,802.

This invention relates to an industrial truck, having a load handling member, movable from one position to another and vice versa.

In trucks of this character it is customary to operate its load handling member, which may be a boom, a hook suspended therefrom, a slidably mounted elevating member for transporting and tiering loads, an elevating platform or a tiltable support, by means of an electric motor and to associate with the shaft of such motor a magnetic brake, the windings for which are connected in series with the motor circuit, arranged to become effective and stop the motor when the circuit therefor is broken, either by the return of the controller to neutral position or the automatic operation of a limit switch, which is usually provided for this purpose. It has been found that when the brake elements wear away, so that they fail to stop the motor shaft upon the operation of the controller or limit switch, the load handling member will continue moving, that is, coast, in the same direction in which it was power operated and abut against some portion of the truck and cause damage thereto or such member; this disadvantageous result is more apt to happen when the limit switch breaks the circuit, since, for obvious reasons, it is set to operate at or relatively close to the extreme limits of movement of the load handling member; and to effect speed of operation as well as to relieve the operative of the responsibility of operating the controller, it is customary in the operation of these trucks for the operative to rely substantially entirely upon the limit switch, when operating the load handling member in either direction.

One object of the invention is to overcome this difficulty and danger of damage, by omitting the limit switch and connecting the load handling member or an element of the operating means therefor to the controller, so that the controller may be used to open the motor circuit automatically at either extreme movement of the load handling member and in the event the braking elements fail to operate, due to wear or otherwise, any excess movement of the load handling member will throw the controller to its reverse position, and hence supply current to the motor and effect its operation and the member in the opposite direction, and thus prevent the member from moving into engagement with some portion of the truck. This operation will indicate to the operative that the brake is not operating and allow him to move the controller to its neutral position and stop the motor, after which the brake may be adjusted or repaired as the condition thereof may require.

Other objects of the invention will be apparent to those skilled in the art to which my invention relates from the following description taken in connection with the accompanying drawings.

In the present application of my invention, I have shown a truck of the low lift platform type, wherein the raisable platform constitutes the load handling member.

Referring to the drawings,

Fig. 1 is a side elevation of a low lift platform truck embodying my invention.

Fig. 2 is an elevation on the line 2—2 of Fig. 1, parts being broken away.

Fig. 3 is a plan view of the truck, the top portion of the casing for the lift motor being removed or broken away.

Fig. 3a is a sectional view to show one of the inclines and rollers at the forward end of the truck.

Fig. 4 is an end elevation looking toward the right of Figs. 1 and 3.

Fig. 5 is a fragmentary section on the line 5—5 of Fig. 2.

Fig. 6 is a fragmentary view showing the lift motor in elevation and the magnetic brake therefor in section.

In the drawings, 1 indicates a frame mounted on suitable wheels, certain of which are driven by a motor 2, transmitting power through a suitable transmission mechanism within a housing 3. The frame preferably comprises an elevated section 1a and a drop section 1b. In this form of construction a pair of relatively large wheels 4 are arranged below the elevated section 1a and relatively small wheels 5 are arranged below the drop section. In this arrangement the wheels 4 serve as the traction wheels driven by the transmission mechanism.

4a indicates the axle for the wheels 4, terminating in suitable knuckles 4b. 6, 6a indicate seats carried by the frame section 1a and axle 4a for coiled spring 6b. 7 indicates a suspension mechanism for the motor 2 and housing 3 and comprising a pair of U-members. The suspension mechanism is preferably similar to that shown and claimed in Letters Patent No. 1,628,145, dated May 10, 1927. 8 indicates a steering gear preferably connected to both pairs of wheels 4, 5, and simultaneously steering them about a common center by means of a manual steering device 8a. 9 indicates a suitable controller for completing the circuits to the motor, current being supplied by suitable batteries 9a. The controller 9 is connected to an operating lever 10. 11 indicates brackets depending from the outer end of the frame section 1a and arranged to pivotally support a platform 14 for an operative. 15 indicates a foot pedal associated with the platform 14 and connected through a linkage 15a to control a brake mechanism 16 which is normally biased into braking position by a spring as is customary in trucks of this general character, for example, as shown in Letters Patent No. 1,661,852, granted to me.

18 indicates a platform mounted on the drop section 1b and movable upwardly to the position shown in dotted lines in Fig. 1 and downwardly. 19 indicates a casing having standards 20 at its opposite ends suitably secured to a base plate 21 mounted on the inner portion of the frame section 1a, rearward of the batteries 9a. The casing 19 encloses a suitable power transmission mechanism arranged to drive two shafts 22 to which are secured sprocket wheels 23. Suitable sprocket chains 23a which wind on and off the sprocket wheels 23, are connected to the platform (as shown in dotted lines in Fig. 1) to raise or lower it according to the direction of rotation of the shafts 22. The power transmission mechanism is connected through a suitable gear reduction, one element of which is indicated at 22a (see Fig. 6), within a supplemental casing 24 to the shaft 25 of a motor 26. The shaft 25 of the motor 26 extends through the casing 24 and the hollow boss of a supplemental casing member 24a and carries at its free end a disk or braking element 27, which constitutes one element of a magnetic brake and release means. The other element of the brake and release means consists of an annular disk 28, held against rotation by but freely slidable on a series of bolts 27a (only one being shown) which secure a cover 27b to the adjacent portion of the casing member 24a. As shown, the hollow boss of the member 24a fits into the opening through the casing 24 (see Fig. 6) to relate the member to the latter. The non-rotatable disk 28 is normally pressed outwardly by a plurality of springs 29 (only one being shown) into engagement with the disk 27 to brake it or hold it against rotation. The disk 28 is formed of soft iron and is operated inwardly, against the tension of the springs 29, by a winding 29a, when the latter is energized. The winding 29a is connected in series with the motor 26, as shown in Fig. 7, so that when the latter is started the coil is energized and the brake released. The winding 29a fits into an annular recess formed in the casing member 24a and is held therein by an annular plate 29b clamped between the casing member 24a and cover 27b. The plate 29b is formed with openings to accommodate the springs 29. The power transmission mechanism, gear reduction, brake elements, magnetic release means and the motor, above described, are preferably similar to corresponding parts shown in my co-pending application Serial No. 133,699, filed September 4, 1926; likewise, the construction and arrangement of the sprocket wheels and chains and the connection thereof to the platform may also be similar to corresponding parts shown in my aforesaid application, and therefore no claim to any of the subject matters above mentioned is made herein.

The platform 18 is preferably movably supported on the frame section 1b by means of pairs of inclines 31 and rollers 32, the forward pair of inclines and rollers being shown in dotted lines in Fig. 3 and the rearward pair at one side being shown in Fig. 1. The inclines 31 are secured to the underside of the platform and the rollers are mounted on stud shafts carried by the frame section 1b. The chains 23a run around guide sprockets 23b, so that the pull of the chains is in a direction parallel to the planes of the inclines.

The inclines at the inner end of the platform 18 are provided with guides 33 which engage with the lower sides of a pair of rollers 33′ so as to maintain both pairs of inclines 31 in engagement with their respective rollers 32 during the raising of the platform.

34 indicates a controller for completing the circuit from the batteries 9a to the platform lift motor 26. The controller 34 is preferably supported by a standard 34a mounted on the upper portion and at one side of the adjacent casing 19 so as to be in close relation to the power transmission mechanism for reasons which will later appear. The shaft of the controller is provided with an operating lever 35, which is shown in neutral position in Figs. 1 and 2; movement thereof in one direction will supply current to the motor 26 to rotate it in one direction and movement of the lever to the opposite side of the neutral position will reverse the motor connections and rotate the motor in the opposite direction. The lever 35 is connected by a link 36, bell crank 37, link 38 and lever 39 to the lower end of a column 40 suitably mounted for rotation at the outer end of the frame section 1a, this column carrying a handle 41 for the operative. At that end of the controller shaft opposite to the lever 35, it has fixed to it an arm 42. The outer end of the arm is provided with hollow bifurcations 43 in which rocks a boss 43' formed with a threaded opening. 44 indicates a rod threaded at its upper end into the boss opening, and preferably locked by a nut 45. The lower end of the rod is preferably threaded and carries a nut 46. By rotating the rod in the boss opening or by rotating the nut 46, or by rotating both, the distance of the nut 46 from the nut 45 or the free end of the arm 42 may be varied. 47 indicates a rod extending parallel to the rod 44 and movable relative thereto. The upper end of the rod 47 carries a tappet 48 arranged to engage the arm 42 or the nut 45 when the rod moves upwardly and to engage the nut 46 when the rod moves downwardly. The tappet 48 is preferably formed with an opening through which the rod 44 extends, the walls of the tappet opening forming a guide and serving to maintain the rods in operative relation at all times. The rod 47 is provided with a rack 48' throughout a greater portion of its length and this rack meshes with a gear wheel 49 fixed to the adjacent shaft 22, so that when the latter is driven the rod 47 is moved endwise. The walls of the adjacent portion of the casing 19 are formed with aligned openings 49' to receive the rod and in these openings is mounted a guide wall 49a for the rod 47, as shown in Fig. 5.

Referring to Fig. 5, the rods 44 and 47 are shown in the position they occupy when the platform has moved to its normal limit of movement downwardly, and in moving to such position the tappet 48 on the rod 47 has engaged the nut 45 and through it moved the arm 42 from its operated position upwardly to its mid or neutral position (this latter position being shown in full lines in Fig. 5) and opened the motor circuit, following which the brake elements 27, 28, will act to stop further movement; however, if the brake elements fail to operate, due to wear or for some other reason, the platform 18, shaft 22, driving elements and motor shaft will continue to move (coast) in the same direction with the result that the rod 47 will move the controller arm 42 upwardly to the position shown in dotted lines in Fig. 5, thus reversing the motor and closing the circuit thereto. The platform will then move upwardly and if the controller is not moved by the operative to neutral position, the rod 47 will again, if the brake continues to fail, act on the controller arm and move it to its operated or "On" position and again reverse the motor; and this will continue automatically until the controller is moved to its mid position.

From the foregoing description it will be seen that I have provided a safety mechanism to prevent danger when the motor brake fails to operate.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a wheel mounted frame, a load carrying member mounted to move thereon from one position to another, electrically driven power means, including batteries for supplying current thereto, for operating said member, a controller for completing the circuit to the electric motor of said means to drive it in either direction, and means movable with said member in either direction and connected to said controller and arranged to move it from one "On" position to its other "On" position when said member moves beyond a predetermined position in either direction to drive said power means in the opposite direction.

2. In apparatus of the class described, the combination of a wheel mounted frame, a load carrying member mounted to move thereon from one position to another and vice versa, power means including a reversible electric motor and batteries for supplying current thereto, for operating said member, a magnetic brake having its windings connected in series with said motor, a controller for completing the circuit to said motor to drive it in either direction and means movable with said member in either direction and connected to said controller and arranged to move it from one "On" position to its other "On" position when said member moves beyond a predetermined position in either direction due to failure of said brake, to drive said motor in the opposite direction.

3. In apparatus of the class described, the combination of a wheel mounted frame, a load carrying member mounted to move thereon from one position to another and vice versa, power means including a reversible electric motor and batteries for supplying current thereto, for operating said member, a magnetic brake having its windings connected in series with said motor, a controller for completing the circuit to said motor to drive it in either direction, an arm connected to the shaft of the controller, a pair of rods arranged in side by side relation and relatively movable, one connected to said arm and the other movable with said member, and devices carried by said rods and arranged to engage one with the other to move the controller from one "On" position to its other "On" position, when said member moves beyond a predetermined position in either direction to drive said motor in the opposite direction.

4. In apparatus of the class described, the combination of a wheel mounted frame, a load carrying member mounted to move thereon from one position to another, power means, including a reversible electric motor and batteries for supplying current thereto, for operating said member, a controller for completing the circuit to said motor to drive it in either direction, an arm connected to said controller for operating it, a rack wheel operatively connected to said power means and driven thereby, a rack in mesh with said wheel, and connections between said rack and said arm arranged to operate the controller from one operated position to its other operated position in the event said operating means operate beyond a predetermined position in either direction of movement.

5. In apparatus of the class described, the combination of a wheel mounted frame, a load carrying member mounted to move thereon from one position to another and vice versa, power means, including a reversible electric motor and batteries for supplying current thereto, for operating said member, a magnetic brake having its windings connected in series with said motor, a controller for completing the circuit to said motor to drive it in either direction, and connections between said power means and said controller arranged to move the latter from one "On" position to its opposite "On" position in the event said brake fails to operate.

6. In apparatus of the class described, the combination of a wheel mounted frame, a load carrying member mounted to move thereon from one position to another and vice versa, power means, including a reversible electric motor and batteries for supplying current thereto, for operating said member, a magnetic brake having its windings connected in series with said motor, a controller for completing the circuit to said motor to drive it in either direction, and connections between said power means and said controller arranged to move the latter from one "On" position to its opposite "On" position in the event said brake fails to operate, said connections comprising relatively movable elements arranged to co-act as the power means approach their limit of movement in either direction.

In testimony whereof, I have hereunto affixed my signature.

EDWARD H. REMDE.